United States Patent
Plank et al.

(10) Patent No.: US 11,560,996 B2
(45) Date of Patent: Jan. 24, 2023

(54) LIGHTING MODULE SYSTEM AND METHOD FOR CONTROLLING THE LIGHT MODULE SYSTEM

(71) Applicant: ZKW Group GmbH, Wieselburg (AT)

(72) Inventors: Josef Plank, Erlauf (AT); Thomas Schlinger, Boheimkirchen (AT); Andreas Moser, Perg (AT); Bettina Reisinger, Amstetten (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 17/415,907

(22) PCT Filed: Dec. 17, 2019

(86) PCT No.: PCT/EP2019/085491
§ 371 (c)(1),
(2) Date: Jun. 18, 2021

(87) PCT Pub. No.: WO2020/127152
PCT Pub. Date: Jun. 25, 2020

(65) Prior Publication Data
US 2022/0074567 A1 Mar. 10, 2022

(30) Foreign Application Priority Data
Dec. 18, 2018 (EP) ..................................... 18213620

(51) Int. Cl.
*F21S 41/663* (2018.01)
*F21W 103/60* (2018.01)

(52) U.S. Cl.
CPC ........ *F21S 41/663* (2018.01); *F21W 2103/60* (2018.01)

(58) Field of Classification Search
CPC ... F21S 41/153; F21S 41/663; F21W 2103/60
See application file for complete search history.

(56) References Cited

U.S. PATENT DOCUMENTS 10,480,744 B2 * 11/2019 Courcier ............... F21S 41/321
11,156,334 B2 * 10/2021 Morel ..................... B60Q 1/14
(Continued)

FOREIGN PATENT DOCUMENTS

DE 102018105563 A1 9/2018
FR 3043168 A1 5/2017

OTHER PUBLICATIONS

International Search Report for PCT/EP2019/085491, dated Apr. 20, 2020 (12 pages).
(Continued)

*Primary Examiner* — Matthew J. Peerce
(74) *Attorney, Agent, or Firm* — Eversheds Sutherland (US) LLP

(57) ABSTRACT

Light module system, comprising a first light module and a second light module, wherein the first light module can be controlled in dependence on the second light module, wherein the first light module is configured as a non-high-resolution light module, and is set up to generate a light distribution of a first type (1, 10) in a region in front of the light module system, wherein the light distribution of the first type (1, 10) can be dimmed, the second light module is configured as a high-resolution light module, wherein a minimum brightness is associated with a sector (4) of the light distribution of the first type, and the second light module is set up to generate at least one ground-projection light distribution (3) in an operating mode, wherein the at least one ground-projection light distribution (3) is a visual presentation of information, and thereby to cause the first light module to, at least partially, dim the light distribution of the first type, and to illuminate the sector (4) of the light distribution of the first type.

18 Claims, 1 Drawing Sheet

(56) References Cited

U.S. PATENT DOCUMENTS

| | | |
|---|---|---|
| 2018/0086254 A1 | 3/2018 | Morel et al. |
| 2018/0118095 A1 | 5/2018 | Kunii |
| 2018/0238512 A1 | 8/2018 | Courcier et al. |

OTHER PUBLICATIONS

Search Report for European Patent Application No. 18213620.0 dated Jun. 3, 2019 (8 pages).

* cited by examiner

LIGHTING MODULE SYSTEM AND METHOD FOR CONTROLLING THE LIGHT MODULE SYSTEM

The invention relates to a light module system comprising a first light module and a second light module, wherein the first light module can be controlled in dependence on the second light module, wherein the first light module is configured as a non-high-resolution light module, and is set up to generate a light distribution of a first type in a region in front of the light module system, wherein preferably the entire light distribution of the first type can be dimmed, the second light module is configured as a high-resolution light module, wherein a minimum brightness is assigned to a sector of the light distribution of the first type.

The invention furthermore relates to a method for the control of a light module system of a motor vehicle headlight, wherein the light module system generates a light distribution in which at least one item of information is visually presented.

In addition, the invention relates to a computer program comprising commands that cause the light module system of the aforementioned type to perform the method of the aforementioned type, and to a computer-readable medium with such a computer program.

The invention furthermore relates to a motor vehicle control device, in particular a control device for a light module system of the aforementioned type, with a computer-readable medium of the aforementioned type.

The invention furthermore relates to a motor vehicle, or a motor vehicle headlight, with at least one light module system of the aforementioned type, and/or with at least one computer-readable medium of the aforementioned type, or with at least one motor vehicle control device of the aforementioned type.

Today, motor vehicle headlights are already equipped with high-resolution light modules that make it possible to generate flexible light distributions, predominantly in a central region. Among other features, such light modules can be used to project various symbols onto the road in front of, or next to, the motor vehicle. The high-resolution light modules can thus be used for a visual presentation of information, wherein the corresponding symbol projections, which serve as a visual presentation of the information, are often summarised under the term "Advanced Information Beam" (AIB). In addition to the high-resolution light modules, conventional light modules, which usually have a lower or coarse resolution, are used in such motor vehicle headlights to cover peripheral regions of the light distribution.

Based on the above, the aforementioned dimmability of the entire light distribution of the first type is understood to mean that not only can the entire light distribution be dimmed, but also predefined sectors of the light distribution can be dimmed independently, or also in dependence on the rest of the light distribution.

When implementing AIB, it is desirable that the symbols that present the information visually are displayed in the apron region of the light distribution with sufficient contrast so as to be clearly discernable.

The object of the present invention is to provide a light module system, together with a method for the control of a light module system, which make it possible to improve the perception of the visually displayed information without impairing the brightness in predefined, preferably essential regions of the light distribution and, in particular, without falling below the minimum brightness in these regions.

The object is achieved with a light module system of the aforementioned type in accordance with the invention, in that the second light module is set up to generate at least one ground-projection light distribution in an operating mode, wherein the at least one ground-projection light distribution comprises, or is, a visual presentation of information, and in doing so to cause the first light module (directly or indirectly) to at least partially—preferably successively—dim (dim down) the light distribution of the first type, and to illuminate the sector of the light distribution of the first type. The second light module preferably illuminates all regions or sectors of the light distribution of the first type, whose brightness has been reduced, except for the region immediately around the ground-projection light distribution.

The expression "a minimum brightness is assigned to a sector of the light distribution" means that for this sector of the light distribution a minimum brightness is prescribed, below which it must not fall, if, for example, the light distribution is dimmed down, or back, from its full brightness. The minimum brightness for certain motor vehicle lighting systems can, for example, be prescribed at certain points, and/or segments of the light distribution, or the sector of the light distribution (see, for example, ABI. L 222 of the European Union, 24 Aug. 2010, pp. 1-61).

The formulation that "the second light module is set up to generate at least one ground-projection light distribution in an operating mode, . . . , and thereby to cause the first light module (directly or indirectly) to dim (dim down) the light distribution of the first type at least partially", expresses the fact that the second light module sends appropriate control signals (commands) to the first light module after, preferably as soon as, it has generated the ground-projection light distribution, and thereby causes the first light module—in this case directly—to dim, at least partially, the light distribution of the first type.

For example, the second light module can cause the first light module to dim the entire light distribution of the first type, or only a sector of the light distribution of the first type, preferably successively, immediately after it has generated the ground-projection light distribution.

In that the second light module in the operating mode mentioned above illuminates the sector of the light distribution, when the light distribution of the first type is dimmed, it assists the first light module and causes the brightness in this sector not to be significantly impaired, and in particular to remain constant, and never to fall below the minimum brightness. This means that the second light module starts to illuminate the sector of the light distribution at the earliest at the point in time when the first light module starts to dim the light distribution of the first type—in this case the brightness of the sector of the light distribution remains essentially constant, and starts to illuminate at the latest at the point in time when the brightness in the sector of the light distribution reaches the minimum brightness, or is reduced to the minimum brightness—in this case the brightness in the sector of the light distribution is only reduced for a short time.

In the context of the present invention, the term "high-resolution light module" or "non-high-resolution light module" is to be understood to mean a light module that is set up to generate a high-resolution, or a non-high-resolution, light distribution.

The "resolution of a light distribution" can be defined in terms of the smallest region of this light distribution that can be blanked out, that is to say, the smallest region that can be controlled independently.

If, for example, a motorcycle with a width of 1 m is assumed to be the smallest possible road user, a (horizontal) region of 1.5 m should ideally be blanked out for this road user. It is to be understood that this region should not be blanked out directly at the headlight, but rather at a certain distance from the latter. To calculate this distance, the maximum legally permitted luminous intensity of 215,000 cd that a headlight can emit, can be used, for example. At a distance of about 463 m, 215,000 cd corresponds to an illuminance of 1 lux—this distance is often referred to as the "1 lux limit". If another road user, for example the aforementioned motorcycle, is located within the 1 lux limit, it should be blanked out to prevent glare. A region of 1.5 m at a distance of 463 m corresponds to an aperture angle (as seen from the headlight), and thus a resolution, of about 0.18°.

In summary, the light distributions—and also the light modules that generate these light distributions—can be characterised as follows in terms of resolution:

High-resolution light distribution: resolution is less than or equal to 0.2°, for example between 0.1° and 0.18°;
High performance resolution: resolution is between 0.2° and 0.5°;
Transition region: resolution is between 0.5° and 1°;
Medium resolution: resolution is between 1° and 3°;
Coarse resolution: resolution is greater than 3°.

The resolutions can also correspond to headlight functions that are implemented by means of the light modules. For example, a coarse resolution light module can be used for a pure dipped beam function, and/or a non-glare-free main beam function. Headlight modules, with which a high performance resolution can be achieved, can generate a glare-free main beam (e.g. LED matrix systems). The light modules that can produce a light distribution with a medium resolution can, in addition to a glare-free main beam, also produce other dynamic dipped beam functions, such as bend lighting, without the need to swivel the light module.

The high-resolution light modules take the form of light modules that are set up to generate projections of symbols, lines, lettering, etc. onto the road, or onto another projection plane.

The second light module is preferably a DLP light module. The resolution of such a light module can be determined by the resolution of the DLP chip used in the DLP light module. In a preferred form of embodiment, a DLP chip has a resolution of 1.3 megapixels, that is to say, 1156*1156 pixels. In this manner, a DLP light module can achieve a significantly higher resolution of the light distribution than the aforementioned 0.2°.

Other high-resolution modules such as DMDs, laser scanners, LCDs, high-resolution LED arrays or similar, also come into consideration as the technology for the second light module.

In the context of the present invention, the term "region in front of the light module system" is to be understood to mean a region in front of the light modules of the system—as viewed in the main direction of radiation. When the light modules of the light module system are installed in a motor vehicle headlight, this region refers to a region in front of the motor vehicle headlight. In the field of motor vehicle lighting technology, a light distribution is to be understood to mean, depending on the context, either a three-dimensional light cone generated by a light module or a motor vehicle headlight—that is to say, light emitted in a cone shape by the light module or the motor vehicle headlight—or a two-dimensional projection of this light cone onto the ground—the term "ground-projection" is often used here—or onto an imaginary plane arranged at right angles to the main direction of emission. Such a plane can be, for example, a measurement screen in a lighting technology laboratory, which is arranged at a distance of about 25 metres in front of the light module, the light module system, or the motor vehicle headlight. The aforementioned region typically starts at about 1 metre in front of the light module system.

The term "undimmed" or "dimmed" light distribution is to be understood to mean a light distribution that has a non-reduced, or a reduced, brightness respectively.

The minimum brightness can, for example, be a minimum brightness required by law, for example in accordance with ECE, FMVSS, AIS, or CCC. For example, minimum brightness values according to ECE-R123 are prescribed in the region of the asymmetric rise of an asymmetrical light-dark boundary of a dipped beam distribution.

The first light module can, for example, comprise a dimmable illuminant (a semiconductor-based light source, such as laser diodes, LEDs, etc.) and/or an aperture device, whose light transmittance can be varied so as to dim the light distribution. Such an aperture device can, for example, comprise an LCD, LCoS, or similar, or can be configured as such.

It can be appropriate if the light module system further comprises a control device associated with the first and second light modules, and is set up to control the first and second light modules, and to control the first light module in dependence on the second light module, as described above. If the above-described control signals are received by the first light module from the second light module by way of the control device, the second light module indirectly controls the first light module. Furthermore, the control device can operate the second light module in various operating modes, described below in terms of examples, and can switch between the modes. The control device can, for example, also control the aforementioned illuminant, and/or the aforementioned aperture device. The control device can, for example, send control signals to the first light module and the second light module, and can receive control signals from the first light module and the second light module. In particular, the control device can control the second light module, and can control the first light module in dependence on the second light module, as follows:

Transmission of command 1 to the second light module: Project symbol (ground-projection light distribution is generated);
Transmission of command 2 to the first light module: Dim, at least partially, the light distribution (the light distribution of the first type is dimmed at least in a region including the ground-projection light distribution and the sector of the light distribution to which the minimum brightness is assigned);
Transmission of command 3 to the second light module: Illuminate the sector of the light distribution to which the minimum brightness is assigned (the brightness of this sector of the light distribution preferably remains unchanged).

In a preferred form of embodiment, provision can be made for the ground-projection light distribution to be fully included within the light distribution of the first type. It is to be understood that terms such as "included", "overlap" etc. refer to positions of the light distributions, or regions of these light distributions, to which the aforementioned projections of the corresponding light cones refer. This is again illustrated by FIG. 2 below.

Furthermore, provision can be made for the second light module to be set up in the operating mode to illuminate the sector of the light distribution, when the dimming of the light distribution of the first type results in the minimum brightness in the sector of the light distribution of the first type (from above) being achieved. Here it should be emphasized that the sector of the dimmed light distribution is illuminated as soon as the minimum brightness is achieved—that is to say, at the same time as the achievement of the minimum brightness.

This has the advantage that the assistance of the dimmable light distribution of the first type, for example of a dimmable dipped beam light distribution, takes place under a further condition—namely, when the minimum brightness is achieved in the sector of the dimmed light distribution, for example in a region of the light distribution comprising the light-dark boundary. In this way, the time in which the second light module illuminates the sector of the dimmed light distribution can be reduced, and, as a consequence, energy consumption can be optimised.

A sensor device such as a camera can, for example, be assigned to the aforementioned control device in order to measure the brightness of the light distributions generated by the light module system. However, it is not necessary to measure the brightness of the light distributions generated. It is conceivable, for example, that the first light module includes a dimming threshold as a dimming parameter. If the first light module is dimmed to this dimming threshold, the minimum brightness values are (automatically) achieved in the aforementioned sector of the dimmed light distribution. When the dimming threshold is achieved, that is to say, when the brightness is reduced to the dimming threshold, the first light module can communicate this to the second light module (directly, or by way of the control device). The second light module can then start to illuminate the aforementioned sector of the light distribution.

Furthermore, provision can advantageously be made for the sector of the light distribution of the first type, to which the minimum brightness is assigned, to comprise a light-dark transition.

The minimum brightness can be expressed, for example, as a minimum illuminance.

In a preferred form of embodiment, provision can be made for the first light module to be a coarse resolution dipped beam module, for the light distribution of the first type to be a dipped beam distribution, and for the sector of the light distribution of the first type, to which the minimum brightness is assigned, to comprise a light-dark boundary, for example an asymmetric light-dark boundary.

Furthermore, provision can advantageously be made for the second light module to be operable in a further operating mode, wherein in the further operating mode the second light module generates a light distribution of a second type, wherein the light distribution of the first type and the light distribution of the second type together form a total light distribution, wherein the light distribution of the second type is preferably a partial main beam distribution, and the total light distribution is a main beam distribution.

"Partial main beam distribution" is to be understood to mean a partial light distribution that, together with a dipped beam distribution, forms a main beam distribution.

It can be appropriate for the second light module to be set up to emit a high-resolution light distribution in a horizontal angular range between about −20° and about +20°, for example between about −12° and about +12°, in particular between about −8.5° and about +8.5°, preferably between about −7° and about +7°.

The term "horizontal angular range" is to be understood to mean an angular range, in a two-dimensional projection of the light distribution onto a plane at right angles to the main direction of radiation. Often these specifications relate to the aforementioned measurement screen in a lighting technology laboratory. This horizontal angular range also corresponds to the azimuthal aperture angle of the light cone.

In a preferred form of embodiment, provision can be made for the visually displayed information to be at least one of the following: navigation information, such as a directional arrow; lettering; a logo; pedestrian communication, e.g. in the form of a projected zebra crossing, welcome logos, or similar.

The aforementioned object is also achieved with a method of the aforementioned type in accordance with the invention, whereby the method has the following steps:

Provision of a light module system, wherein the light module system comprises a first light module and a second light module, wherein the first light module can be controlled in dependence on the second light module, wherein the first light module is configured as a non-high-resolution light module, and the second light module is configured as a high-resolution light module;

Generation of a dimmable light distribution in a region in front of the light module system by means of the first light module, wherein a minimum brightness is assigned to a sector of the dimmable light distribution;

Generation of at least the ground-projection light distribution in the region in front of the light module system by means of the second light module so as to display the information visually;

Causation of the first light module, by means of the second light module, to dim the dimmable light distribution, at least partially, so as to produce a dimmed light distribution, and illumination of the sector of the dimmed light distribution to which the minimum brightness is assigned, by means of the second light module.

The ground-projection light distribution, by means of which the information is visually represented, is preferably completely included in the region illuminated by the dimmable light distribution of the first type. Stated more specifically, the two-dimensional projection of the ground-projection light distribution onto the ground is comprised by the two-dimensional ground-projection of the dimmable light distribution of the first type.

The second light module preferably causes the first light module to dim the dimmable light distribution as soon as the second light module generates, or has generated, the ground-projection light distribution, so as to increase the contrast of the ground-projection light distribution (as soon as possible). The sector of the dimmed light distribution is preferably illuminated, either immediately after the first light module starts dimming the light distribution of the first type, or as soon as the minimum brightness in this sector is achieved, that is to say, as soon as the brightness in this sector is reduced to the minimum brightness.

As already mentioned, the minimum brightness can be achieved in the sector of the light distribution that has been dimmed back or down. However, this only happens very briefly, because as soon as the minimum brightness is achieved, the second light module illuminates the sector, and ensures that the brightness in this sector is increased once again, and does not fall below the minimum brightness values.

The object is also achieved with a computer program, wherein the computer program comprises commands that cause the aforementioned light module system to perform the aforementioned method. The computer program can be stored in the light module system, for example in the second light module, in particular on a storage medium in the second light module.

In a preferred form of embodiment, provision can be made for the computer program to be stored on the aforementioned control device, and for the commands of the computer program to cause the control device to perform the aforementioned method.

The object is also achieved with a computer-readable medium with such a computer program.

Provision can be made for the aforementioned control device to comprise the computer-readable medium.

Furthermore, the object is achieved with a motor vehicle control device, with the aforementioned computer-readable medium.

As already mentioned, the light module system can comprise a control device, which, as described above, controls the first and second light modules appropriately. It is appropriate for the vehicle control device to be this control device.

Furthermore, the object is achieved with a motor vehicle, or a motor vehicle headlight, with at least one aforementioned light module system in accordance with, and/or with, at least one aforementioned computer-readable medium, or with at least one aforementioned motor vehicle control device. The motor vehicle control device, that is to say, the control device of the light module system can, for example, be arranged in the motor vehicle headlight(s), and can be an integral sector of the latter. It can also be an integral sector of an electronic central control system of a motor vehicle.

The invention, including further advantages, is explained in more detail below on the basis of exemplary forms of embodiment, which are illustrated in the drawing. In the latter:

In the following figures, unless otherwise stated, the same reference symbols denote the same features.

FIGS. 1 and 2 show light distributions that can be generated with the aforementioned light module system, which is controlled in accordance with the aforementioned method. The light module system can be arranged in a motor vehicle headlight, that is to say, in a motor vehicle.

Figure 1:
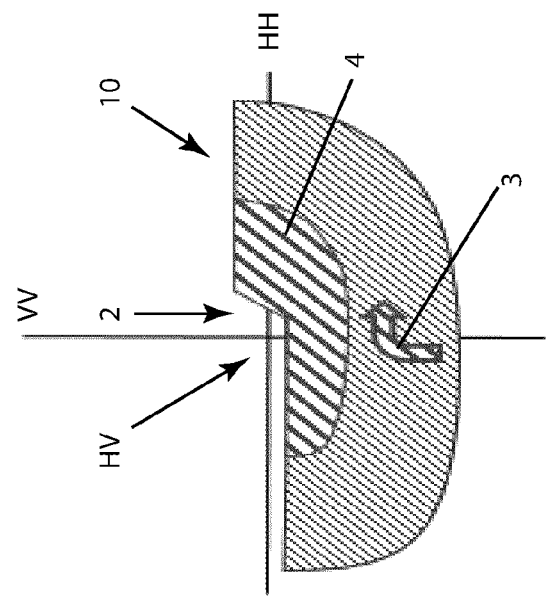
FIG. 1 shows a dipped beam distribution.

Reference is first made to FIG. 1. This shows a dimmable dipped beam distribution 1, which is displayed on a measurement screen in a lighting technology laboratory, for example. FIG. 1 shows an orthogonal coordinate system that is used in most lighting technology laboratories. The X-axis of the system is the HH line, or the horizontal. This is a line on the measurement screen corresponding to the horizon. It runs parallel to the roadway (in the laboratory this is an imaginary roadway). The VV line, or the vertical, stands at right angles to the HH line, and intersects it at a point of intersection HV of the photometric beam axis from the centre of the light module with the measurement screen. The point HV is the origin of the coordinate system. The dimmable dipped beam distribution 1 has an asymmetrical light-dark boundary 2.

The dimmable dipped beam light distribution 1 can correspond to the light distribution of the first type, which is generated by the aforementioned first light module.

Figure 2:
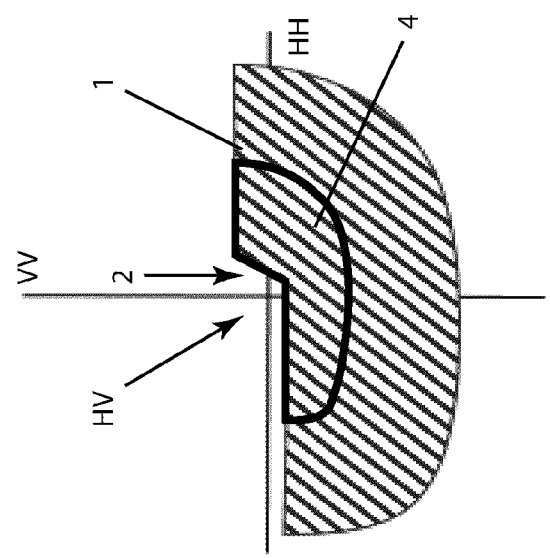
FIG. 2 shows an assisted dipped beam light distribution, and a ground-projection light distribution.

FIG. 2 shows the dimmable dipped beam light distribution 10 in a dimmed state—this is illustrated by a different dashed line pattern—in which the dimmed dipped beam light distribution has a reduced brightness. In addition, FIG. 2 shows a ground-projection light distribution 3 in the form of an arrow bent to the right. The arrow is a visual presentation of information. This can, for example, signal that a turn to the right is planned. As already mentioned, the ground-projection light distribution 3 can be configured in a variety of ways, and can thus visually present a variety of information. The ground-projection light distribution 3 can, for example, be navigation information, such as a directional arrow; lettering; a logo; pedestrian communication, e.g. in the form of a projected zebra crossing, welcome logos, or similar. A ground-projection light distribution of this type is often used to display graphic information and, as already mentioned, is abbreviated as "AIB". The ground-projection light distribution 3 is generated by means of the aforementioned second light module, when the second light module is operated in the (first) operating mode. As soon as the ground-projection light distribution 3 is generated, the second light module causes the first light module to dim the dipped beam light distribution 1. The first light module then generates the dimmed dipped beam light distribution 10. The dipped beam light distribution 1 can also be dimmed after a (rather short) delay, after the ground-projection light distribution 3 has been generated. This increases the contrast and the visibility of the ground-projection light distribution 3, and thus improves the perceptibility of the information visually presented. As already mentioned, a predefined minimum brightness is assigned to a sector 4 of the dipped beam light distribution. This minimum brightness can, for example, be a legally prescribed minimum brightness. This means that in a dimmed state, the dipped beam distribution 1 is not to fall below the minimum brightness, that is to say, is not to fall below the minimum brightness values. In particular, if the minimum brightness is prescribed by law, the brightness must not fall below this value. In the further (second) operating mode, the second light module can generate a partial main beam distribution.

FIGS. 1 and 2 show that in the context of the present invention, the term "sector of a light distribution" is understood to mean a spatially bounded region. The brightness of such a sector can be varied without changing the shape of the sector.

In order not to fall below the minimum brightness, the second light module assists the first light module by illuminating the sector 4 of the dipped beam light distribution 1 while it is operated in the aforementioned (first) operating mode, and generates the ground-projection light distribution 3. FIG. 2 shows that this sector 4 comprises a sector of the asymmetric light-dark boundary 2. By the illumination of the sector 4 with the second light module, it is possible, for example, to achieve the same brightness in this sector 4 as with the undimmed dipped beam light distribution 1—this is illustrated by the same dashed line pattern. It is to be understood that with the aforementioned light module system, or method, or motor vehicle headlight, or motor vehicle, the same brightness in the sector of the light distribution of the first type, which is illuminated by the second light module, can be achieved for other light distributions, or for otherwise configured sectors of the light distributions.

For the sake of brevity, the above description of the invention has been limited to those components that can be helpful in explaining the invention. The person skilled in the art clearly understands from the description that a light module system, for example, can have a multiplicity of further components not explicitly mentioned here, such as adjustment and setting devices, electrical supply means, a sensor means, for example one or a plurality of cameras for determining the brightness of the emitted light distributions, and much more.

The reference numerals in the claims serve only to facilitate an understanding of the present inventions, and in no way imply any limitation of the present inventions.

The invention claimed is:

1. A light module system, comprising:
a first light module; and
a second light module, wherein the first light module can be controlled in dependence of an operating mode of the second light module,
wherein:
the first light module is configured as a non-high-resolution light module, and is set up to generate a light distribution of a first type (1, 10) in a region in front of the light module system, wherein the light distribution of the first type (1, 10) can be dimmed,
the second light module is configured as a high-resolution light module,
a minimum brightness is maintained with a sector (4) of the light distribution of the first type, and
the second light module is set up to generate at least one ground-projection light distribution (3) in an operating mode, wherein the at least one ground-projection light distribution (3) is a visual presentation of information, and
wherein when the second light module projects the visual presentation of information, the first light module is dimmed and the second light module generates an additional ground projection light distribution to maintain the minimum brightness of the sector of the light distribution of the first type while the first light module is dimmed.

2. The light module system according to claim 1, wherein the second light module is set up to illuminate the sector (4) of the light distribution in the operating mode, when the dimming of the light distribution of the first type results in the minimum brightness being maintained in the sector (4) of the light distribution of the first type.

3. The light module system according to claim 1, wherein the sector of the light distribution of the first type comprises a light-dark boundary.

4. The light module system according to claim 1, wherein the first light module is a coarse resolution dipped beam module, the light distribution of the first type is a dipped beam distribution (1, 10), and the sector of the light distribution of the first type (4), with which the minimum brightness is associated, comprises a light-dark boundary (2).

5. The light module system according to claim 1, wherein the second light module is configured to be operated in a further operating mode, wherein the second light module, in the further operating mode, generates a light distribution of a second type, wherein the light distribution of the first type and the light distribution of the second type together form an overall light distribution.

6. The light module system according to claim 1, further comprising a control device, which is operably associated with the first and second light modules, and is configured to control the first and second light modules, and to control the first light module in dependence on the second light module.

7. The light module system according to claim 1, wherein the second light module is configured to emit a high-resolution light distribution in a horizontal angular range between about −20° and about +20°.

8. A method for controlling a light module system of a motor vehicle headlight, wherein the light module system is a light module system in accordance with claim 1, which generates the light distribution, in which the at least one piece of information is visually presented, the method comprising:
generating a dimmable light distribution (1, 10) in the region in front of the light module system by the first light module, wherein the minimum brightness (1, 10) is assigned to a sector (4) of the dimmable light distribution;
generating the at least one ground-projection light distribution (3) in the region in front of the light module system by the second light module, so as to display the information;
causing the first light module, by the second light module, to dim the dimmable light distribution (1), at least partially, so as to produce the dimmed light distribution (10); and
illuminating the sector (4) of the dimmed light distribution (10) to which the minimum brightness is assigned, by the second light module.

9. The method according to claim 8, wherein the causing the first light module to dim the dimmable light distribution (1) occurs immediately after the generating the at least one ground-projection light distribution (3), and wherein the illuminating the sector (4) of the dimmed light distribution (10) occurs either immediately after the first light module starts to dim the light distribution of the first type, or as soon as the minimum brightness is achieved in this sector (4), wherein the second light module is operable to illuminate the sector of the dimmed light distribution.

10. The method according to claim 8, wherein the sector of the light distribution (4) of the first type, with which the minimum brightness is associated, comprises a light-dark transition.

11. The method according to claim 8, wherein the light distribution is a dipped beam light distribution (1) with a coarse resolution, and the sector of the light distribution of the first type (4), with which the minimum brightness is associated, comprises a light-dark boundary (2).

12. A motor vehicle control device comprising:
a memory configured to store computer-executable instructions; and
at least one computer processor configured to access the memory and execute the computer-executable instructions to carry out the method according to claim 8.

13. A motor vehicle comprising at least one light module system according to claim 1.

14. The light module system according to claim 4, wherein the light-dark boundary is an asymmetric light-dark boundary.

15. The light module system according to claim 5, wherein the light distribution of the second type is a partial main beam distribution.

16. The light module system according to claim 7, wherein the horizontal angular range is between about −12° and about +12°.

17. The light module system according to claim 7, wherein the horizontal angular range is between about −8.5° and about +8.5°.

18. The light module system according to claim 7, wherein the horizontal angular range is between about −7° and about +7°.

* * * * *